United States Patent [19]

Ozawa et al.

[11] Patent Number: 5,158,113
[45] Date of Patent: Oct. 27, 1992

[54] HEAVY-DUTY HOSE HAVING A MULTI-LAYERED CORE TUBE

[75] Inventors: Osamu Ozawa, Hiratsuka; Takashi Sato, Kanagawa, both of Japan

[73] Assignee: The Yokohama Rubber Co., Ltd.

[21] Appl. No.: 715,855

[22] Filed: Jun. 17, 1991

Related U.S. Application Data

[63] Continuation of Ser. No. 210,684, Jun. 23, 1988, abandoned.

[30] Foreign Application Priority Data

Jun. 26, 1987 [JP] Japan .................. 62-159378

[51] Int. Cl.$^5$ ............................................. F16L 11/00
[52] U.S. Cl. ........................... 138/137; 138/125; 138/126
[58] Field of Search ............... 138/124, 125, 141, 126, 138/109, 137; 285/256

[56] References Cited

U.S. PATENT DOCUMENTS

| | | | |
|---|---|---|---|
| 4,474,217 | 10/1984 | DeMarse et al. | 138/137 |
| 4,633,912 | 1/1987 | Pilkington et al. | 138/137 |
| 4,652,475 | 3/1987 | Haney et al. | 138/137 |
| 4,657,285 | 4/1987 | Akiyama et al. | 138/137 |
| 4,759,388 | 7/1988 | Kiyama et al. | 138/137 |
| 4,762,589 | 8/1988 | Akiyama et al. | 138/137 |
| 4,842,024 | 6/1989 | Palinchak | 138/125 |

Primary Examiner—James E. Bryant, III
Attorney, Agent, or Firm—Finnegan, Henderson, Farabow, Garrett & Dunner

[57] ABSTRACT

A hose is disclosed which is characterized by enhanced durability against severe pressure and temperature conditions and by improved coupler attachment without bulging. The hose has a multi-layered inner tube including an inner wall and an outer wall formed respectively of a selected class of rubbers. Both walls are so structured as to satisfy specified modulus and thickness characteristics.

8 Claims, 7 Drawing Sheets

$M_1 = 40 \text{ kgf/cm}^2$)
$\beta = +0.00035$
$\ell_0 = 0.2 \text{ cm}$

$\ell_0 = 0.2$ cm
⊙ = not bulged (Examples 1-9)
× = bulged (Comparative Examples 1-7)

FIG. 8A $M_1 = 40$ kgf/cm²)
$\beta = +0.00035$
$\ell_0 = 0.2$ cm

FIG. 8B

HEAVY-DUTY HOSE HAVING A MULTI-LAYERED CORE TUBE

This application is a continuation of application Ser. No. 07/210,684, filed June 23, 1988 now abandoned.

BACKGROUND OF THE INVENTION

1. Field of the Invention

This invention relates hoses suitable for hydraulic or high-pressure use and more particularly to such hoses having specified modulus and thickness characteristics.

2. Prior Art

In general, heavy-duty hoses are used to transport or otherwise handle oily fluids at elevated pressure and temperature for prolonged periods of time. Known hoses of this type are constructed with a brass-plated, wired layer of reinforcement or with a multi-layered inner tube having inner and outer peripheral walls formed of different rubbers. A metal coupling joint is usually clamped on both ends of the hose to enable connection with various piping arrangements. Clamping force is intense enough to protect the coupler against loosening or detachment due to pressure being internally exerted by the hose in service.

The foregoing prior hose of a multi-layered structure is prone to develop varying strains under such clamping force because the laminated rubbers are physicallay different. This in turn leads to bursted rubber in the vicinity of a boundary of the rubbers and eventual delamination, given somewhat adhesiveness, and thus results in expanded or sometimes ruptured inner wall at adjacent to the coupler as is commonly termed bulging.

Certain rubber materials have been proposed which are highly resistant to oils and thermally stable at ambient temperatures generally of 120° to 150° C. They include for example acrylonitrile-butadiene copolymer rubber (NBR), acrylic rubber (ACM), ethylene-acrylic copolymer rubber (AEM), ethylene-acrylic-vinyl acetate terpolymer rubber (ER), chlorosulfonated polyethylene rubber (CSM), chlorinated polyethylene rubber (CM) and hydrogenated acrylonitrile-butadiene copolymer rubber (hydrogenated NBR) in which the conjugated dienes are hydrogenated.

Most heat-resistant among the above rubbers is hydrogenated NBR hereunder called H-NBR. However, H-NBR needs to be cured in the presence of an organic peroxide so as to produce that quality in a maximum extent. Peroxide-cured H-NBR, though adequately adhesive to other rubbers so cured, is less bondable to brass-plated wires or organic fibers useful for reinforcement. A wire-reinforced hose, usually exposed to more severe conditions than a fiber-reinforced hose, is susceptible to bursting arising out of insufficient adhesion between the inner rubber tube and the wired layer. Firm bonding of rubbers to wires and also to fibers is a great concern from the hose performance point of view.

A hose of an H-NBR inner tube combined with a brass-plated, wired layer has been found impractical as this rubber is not sufficiently bondable to the wires.

An improved type of hose has been proposed by the present inventors, the hose being comprised of an inner tube including an inner wall and an outer wall, and a reinforcing layer superimposed one on another as disclosed in U.S. Ser. No. 072, 567. The inner wall is formed of peroxide-cured H-NBR, and the reinforcement is made of brass-plated wires. The outer wall disposed for contact with the wires is composed of acrylonitrile-butadiene rubber (NBR), sulfur (S), an organic peroxide (PO) and a 6-R-2,4-dimercapto-1,3,5-triazine (F) as later referred to simply as NBR-S-PO-F. This hose, though quite satisfactory in respect of other important qualities, is liable to bulge when clamped with a coupler.

SUMMARY OF THE INVENTION

It has now been found that bulging is closely associated, as noted below, with the moduli and thicknesses of different rubbers used in the inner and outer walls of a multi-layered inner tube for a heavy-duty hose.

1. No bulging occurs if either one of the two walls is rendered smaller than a limited range of thicknesses.

2. Thickness ratios of both walls may be varied without bulging by controlling the moduli of rubbers particularly at from 120° to 170° C.

3. A certain equation can be written, from experimental results, to express the interrelation between moduli and thickness ratios within which to protect the hose from bulging.

The present invention, therefore, seeks to provide a novel hose which is sufficiently durable against adverse pressure and temperature conditions and highly capable of exhibiting a good balance of modulus and thickness characteristics without involving objectionable bulging.

According to the invention, there is provided a hose comprising an inner tube including an inner peripheral wall and an outer peripheral wall, and a reinforcing layer superimposed one on another, the inner and outer walls meeting the modulus and thickness characteristics of equations (I) and (II)

$$-0.00035 \leq l_0 \cdot (1/M_2 - 1/M_1) \cdot r \cdot (1-r) \leq +0.00035 \quad \text{(I)}$$

and $$0.05 \leq r \leq 0.95 \quad \text{(II)}$$

where $l_0$ (cm) is a total thickness of the inner tube, r is a thickness ratio of the outer wall to the inner tube, $M_1$ (kgf/cm$^2$) is a 50% modulus of the outer wall at a temperature at which the hose is used, and $M_2$ (kgf/cm$^2$) is a 50% modulus of the inner wall at the same temperature as defined above.

DETAILED DESCRIPTION OF THE INVENTION

Figure 1:
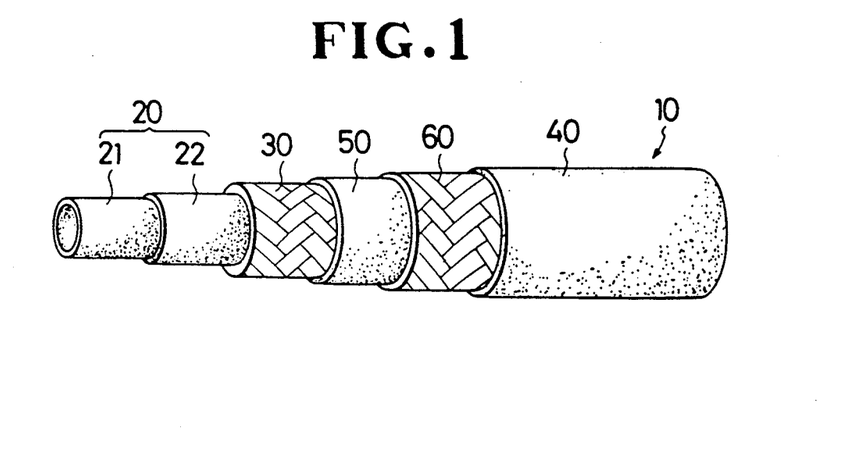
FIG. 1 is a segmentary perspective view, partly broken, of the hose embodying the present invention.

Referring to the drawings and to FIG. 1 in particular, there is shown a hose provided in accordance with the present invention. The hose 10 essentially comprises an inner tube 20 and a reinforcing layer 30 laminated thereon, the inner tube 20 being of a multi-layered structure having an inner peripheral wall 21 and an outer peripheral wall 22. An outer cover 40 may if desired be laminated on the layer 30. The hose 10 is herein represented as being further made up of an intermediate layer 50 and an additional reinforcement 60 interposed between the layer 30 and the cover 40.

Importantly, the inner tube 20 should meet the modulus and thickness characteristics defined by equations (I) and (II)

$$-0.00035 \leq l_0 \cdot (1/M_2 - 1/M_1) \cdot r \cdot (1 - r) \leq +0.00035 \quad (I)$$

and $$0.05 \leq r \leq 0.95 \quad (II)$$

where $l_0$: total thickness of inner tube 20 (cm);

r: thickness ratio of outer wall 22 to inner tube 20;

$M_1$: 50% modulus of outer wall 22 at a temperature at which hose 10 is used (kgf/cm$^2$); and $M_2$: 50% modulus of inner wall 21 at the same temperature as defined above (kgf/cm$^2$).

Figure 2A:
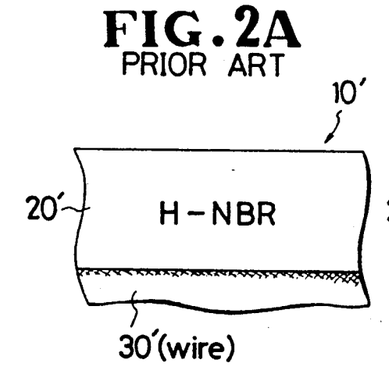
FIGS. 2A to 2C are schematic cross-sectional views of the prior art hoses.
Figure 2B:
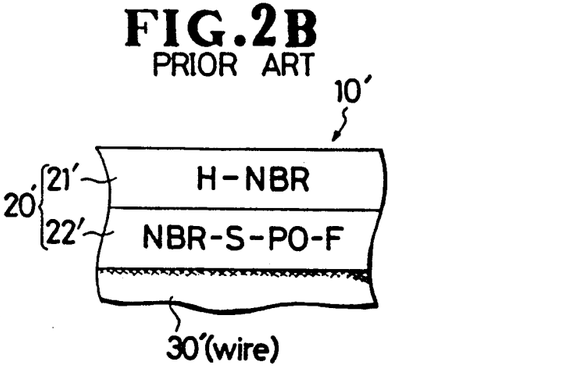
Figure 2C:
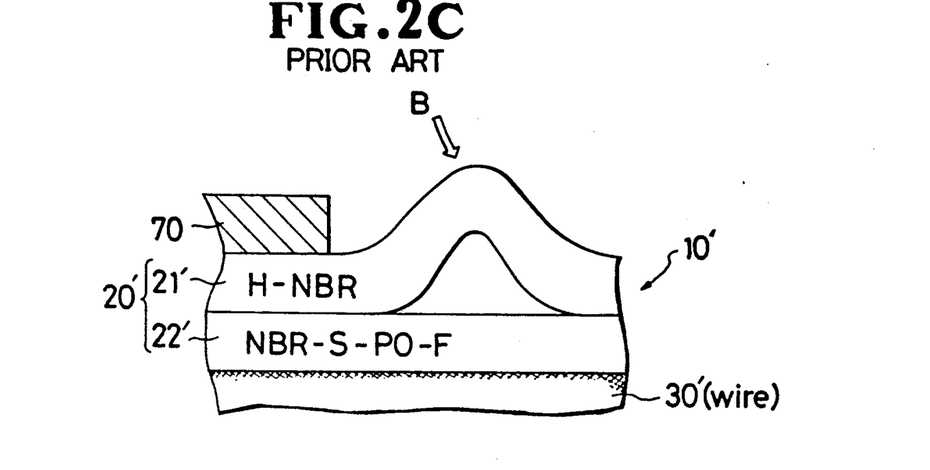

FIGS. 2A to 2C represent prior hose constructions which involve unacceptable rubber-wire bonding or undesirable bulging.

Figure 3A:
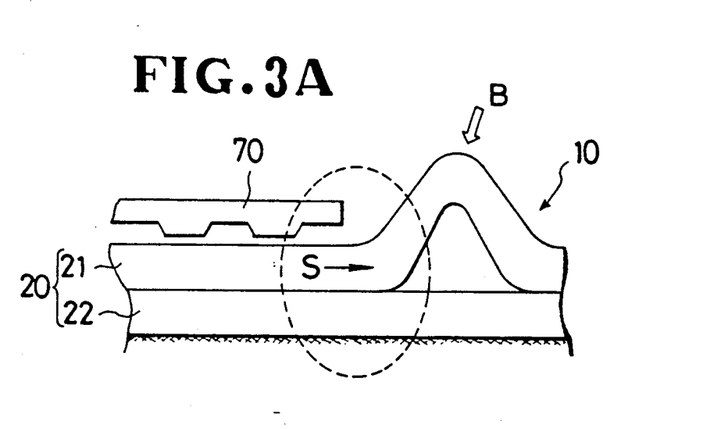
FIGS. 3A to 3C are schematic views explanatory of the principles of the invention.

The principles of the invention will now be described having regard to FIGS. 3A to 3C. Let the hose 10 be assumed to have bulged, as schematically seen at B in FIG. 3A, on the inner wall 21 at one end on which a metal coupler 70 is clamped. Stresses resulting from coupler clamping are too complicated both in direction and in magnitude to define with accuracy. Attention is therefore drawn to only one stress indicated by the arrow S that is deemed most responsible for bulging.

Figure 3B:
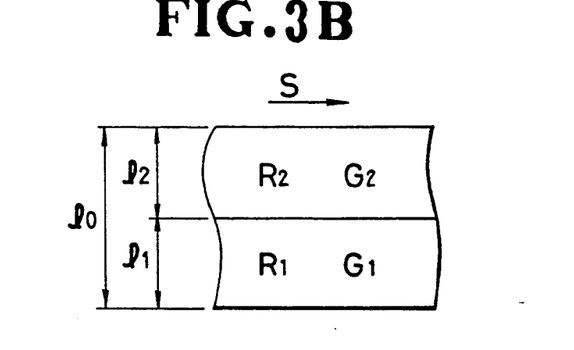
Figure 3C:
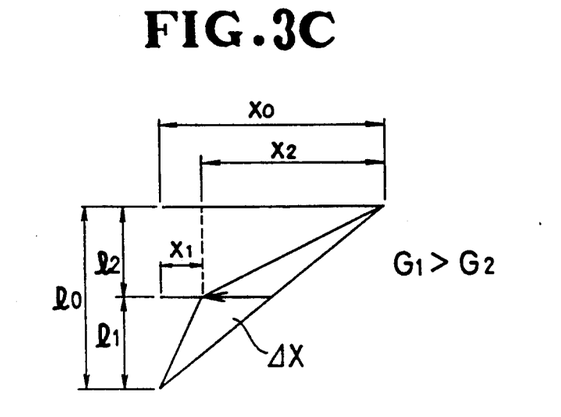

FIG. 3B is illustrated to mean that the outer wall 22 is formed by a rubber material $R_1$ of a shear modulus $G_1$ at a given temperature and of a thickness $l_1$, and the inner wall 21 by another rubber $R_2$ of a shear modulus $G_2$ at that temperature and of a thickness $l_2$. The total thickness $l_0$ of the inner tube 20 turns out to be $$l_0 = l_1 + l_2 \quad (1)$$

The total strain $X_0$ can thus be calculated in terms of $l_0$ as $$X_0 = X_1 + X_2 \quad (2)$$

where $X_1$ is a strain of the rubber $R_1$ under the stress S, and $X_2$ is a strain of the rubber $R_2$. Equation (2), directed to the case where $G_1$ is greater than $G_2$, is applied as such to the converse when taking a strain $\Delta x$ as negative as will later appear clear.

The present inventors have now built up a hypothesis that bulging would take place at above a certain range of proportional constants defined as $\alpha$ between the stress S and the strain $\Delta x$. Close examination has been made to establish the $\alpha$ constants taking rubber properties and hose dimensions in view.

Supposing that $l_0$ is wholly identical in modulus, the sum of $X_l$ and $\Delta x$ at $l_1$ is equivalent to a $l_1$ to $l_0$ thickness ratio r multiplied by $X_0$ and thus is $$X_0 + \Delta x = X_0 \cdot l_1/l_0 = X_0 \cdot r \quad (3)$$
$$r = l_1/l_0 \quad (4)$$
$$1 - r = l_2/l_0 \quad (5)$$

In fact, $G_1$ is not identical to $G_2$ as is apparent from FIG. 3B, $X_1$ and $X_2$ being expressed as $$X_1 = S/G_1 \cdot l_1 \quad (6)$$

$$X_2 = S/G_2 \cdot l_2 \quad (7)$$

Using equation (2), $X_0 = X_1 + X_2$, the total strain $X_0$ is then rearranged to give $$X_0 = (S/G_1 \cdot l_1) + (S/G_2 \cdot l_2) \quad (8)$$

This equation on rearrangement can be written as $$\Delta x = X_0 \cdot r - X_1 \quad (9)$$

Equation (9) insert equations (4), (5), (6) and (8) gives $$\Delta x = S \cdot l_0 \cdot (1/G_2 - 1/G_1) \cdot r \cdot (1 - r) \quad (10)$$

The constant $\alpha$ can then be calculated from equation (10) as $$\alpha = \Delta x/S \quad (11)$$

and thus as $$\alpha = l_0 \cdot (1/G_2 - 1/G_1) \cdot r \cdot (1 - r) \quad (12)$$

Where the rubbers used are under only small strain, a shear modulus G at a given temperature may well be regarded as being substantially proportional to a modulus at 50% elongation (M) at that temperature. Equation (12) may be rearranged on replacement of M for G to provide $\beta$ constants as given by equation (13).

$$\beta = l_0 \cdot (1/M_2 - 1/M_1) \cdot r \cdot (1 - r) \quad (13)$$

Bulging is held immune by strict observance of the constant $\beta$ defined above. In support of this definition, different hoses have been examined under the following conditions.

The test hoses were prepared with their inner and outer walls of varying 50% moduli and thickness ratios, details as regards the rubber formulations and processing methods being more fully described later. The hose was clamped on two opposite ends with a coupler, filled with a hydraulic oil and subsequently sealed at both ends. The resulting hose was oven-aged at 150° C. for 168 hours. Bulging was inspected on the inner wall with the results plotted in FIG. 4.

Figure 4:
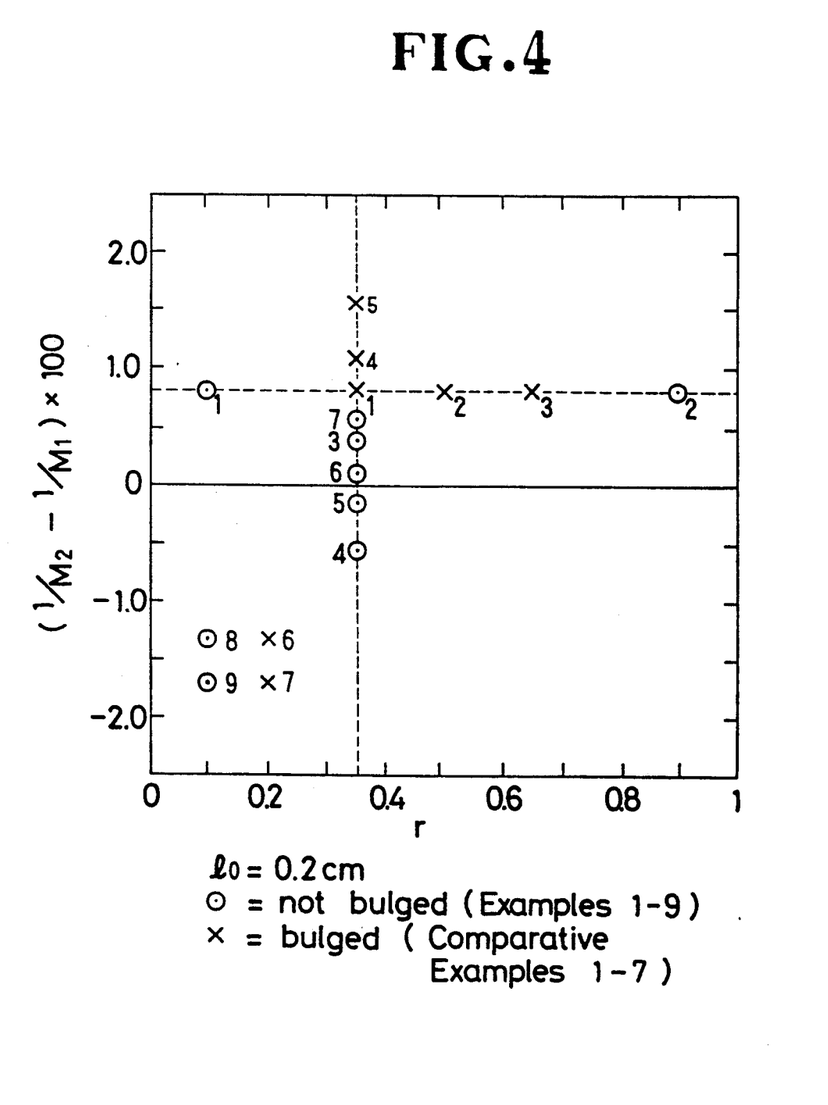
FIGS. 4 to 7 are graphic representations of the correlation between modulus, thickness and bulging.
Figure 5:
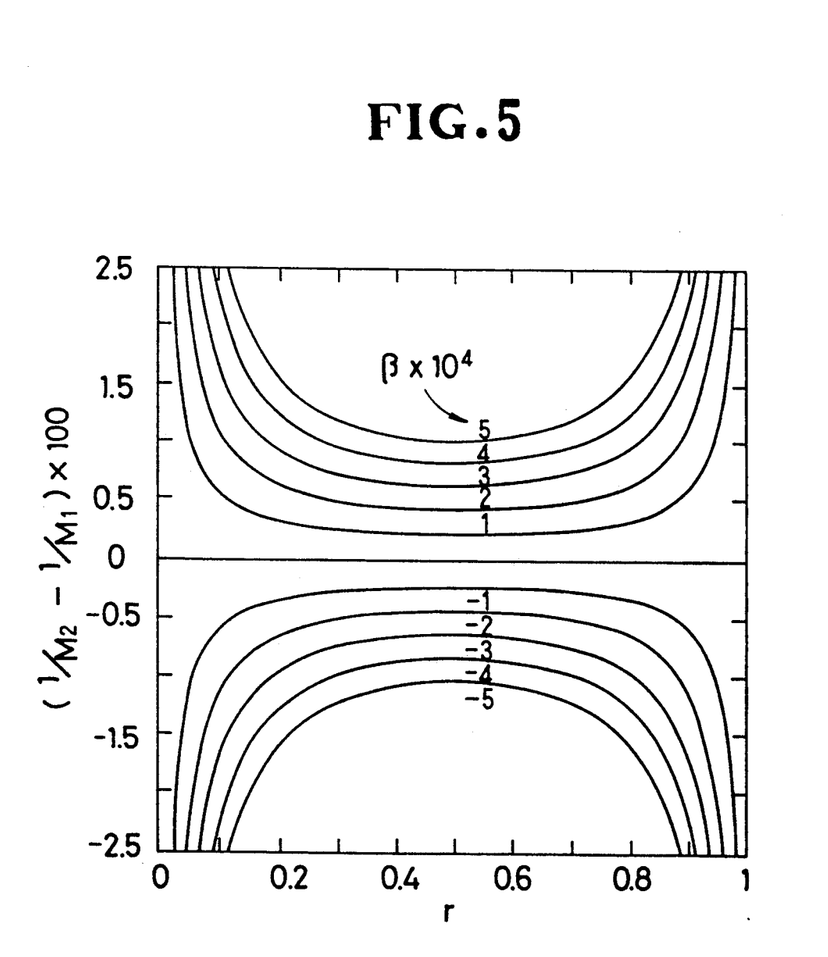

Using the plots of the abscissae axis r versus the ordinate axis $1/M_2 - 1/M_1$, the $\beta$ constants can be calculated from equation (13) as given in FIG. 5. The data now obtained when combined together with FIG. 4 give the data of FIG. 6 from which the hoses of a limited range of $\beta$ constants have been confirmed free from bulging. This is fairly correlative with the foregoing hypothesis.

Figure 6:
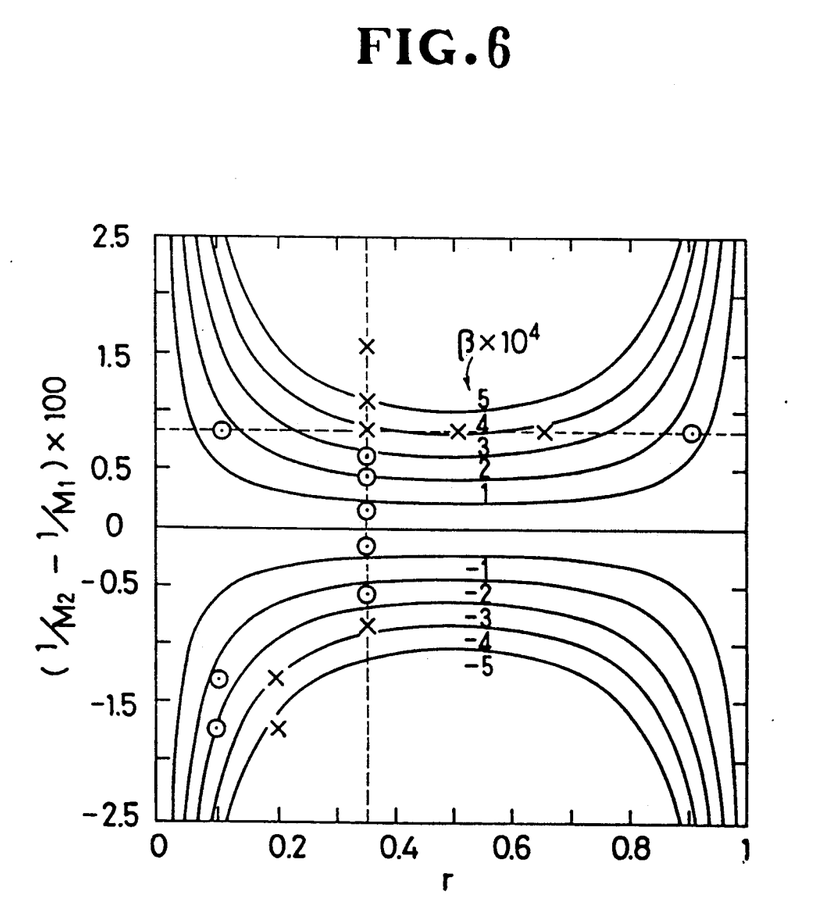
Figure 7:
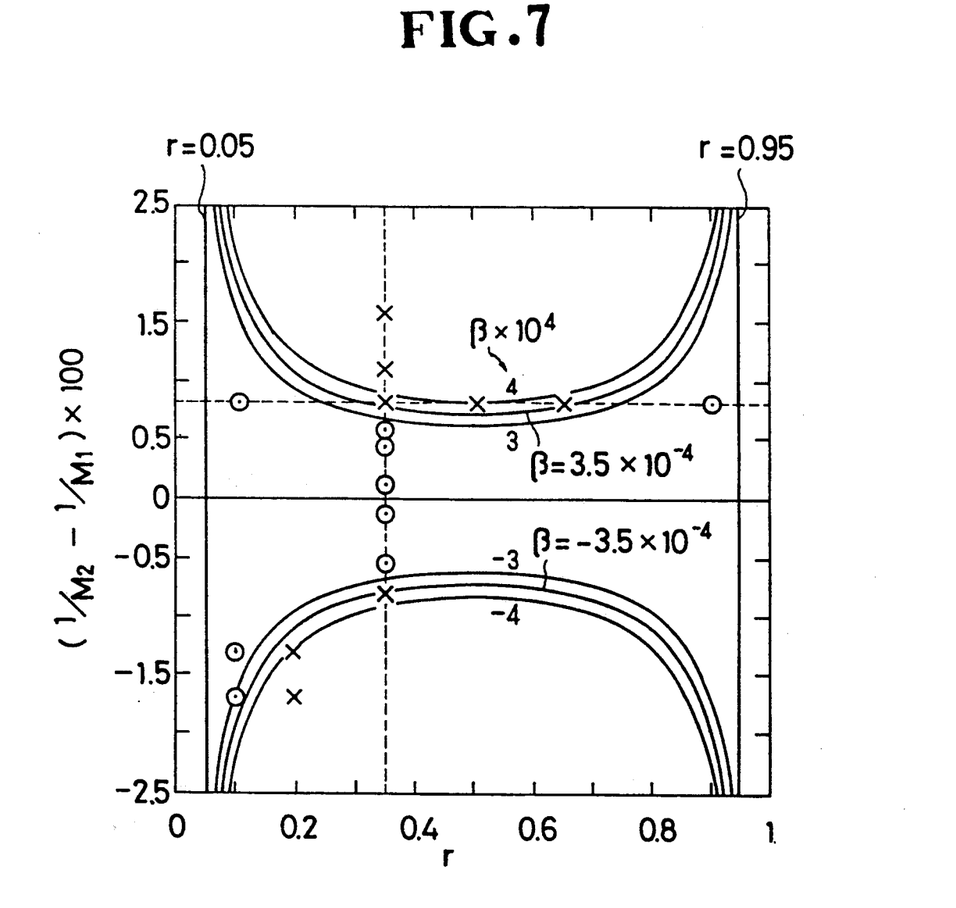

As is clear from FIG. 7 represented to more clearly explain the data of FIG. 6, bulge-free parameters are obtainable between a $\beta = 3.5 \times 10^{-4}$ curve and a $\beta = -3.5 \times 10^{-4}$ curve; that is, both curves are fully agreeable with $$-0.00035 \leq l_0 \cdot (1/M_2 - 1/M_1) \cdot r \cdot (1 - r) \leq +0.00035 \quad (I)$$

Thickness ratios r extremely near to 0 or to 1 are not suitable for practical purposes. As seen in FIG. 7, the ratio should be between r=0.05 and r=0.95 as defined to be $$0.05 \leq r \leq 0.95 \quad (II)$$

Smaller ratios than 0.05 would make the resulting inner wall too thin, and larger ratios than 0.95 would lead to an outer wall of reduced thickness beyond controllability.

Figure 8A:
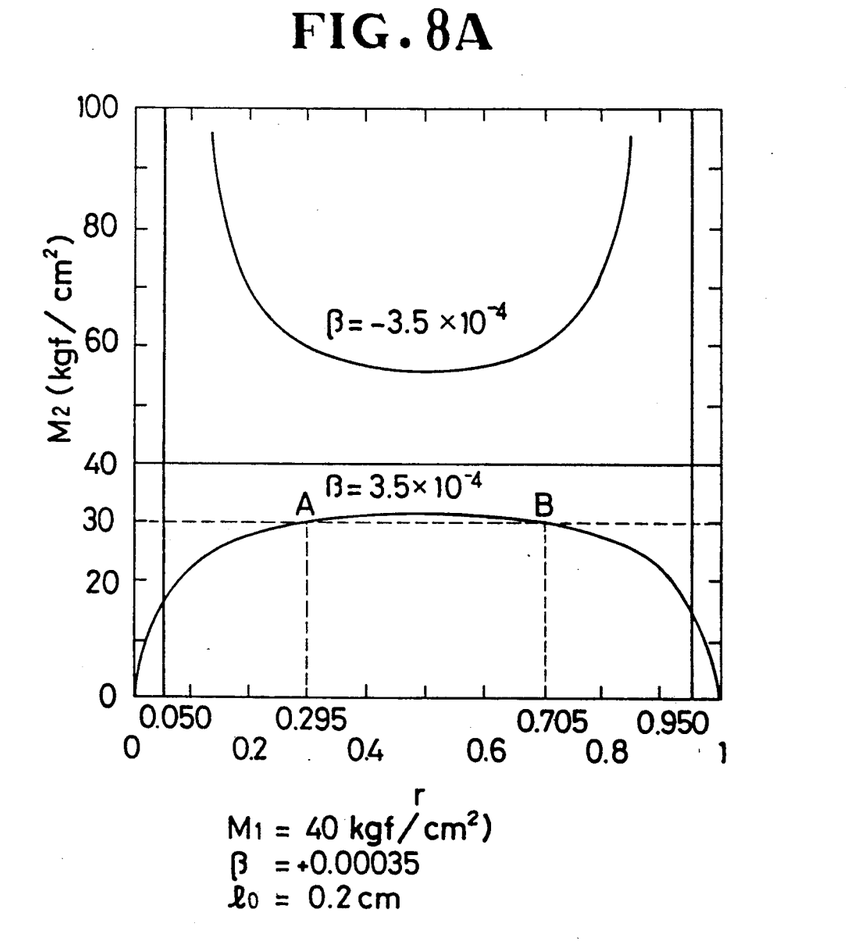
FIGS. 8A and 8B are graphic representations showing the guides to various modulus and thickness parameters in constructing the hose according to the invention.
Figure 8B:
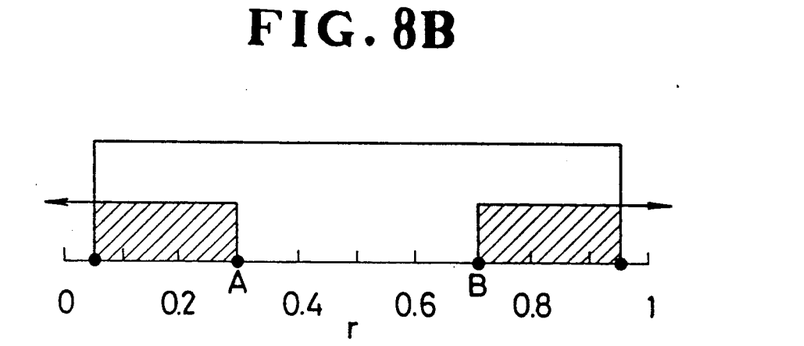

The hose according to the invention may be constructed for instance with $M_1 = 40$ kgf/cm$^2$ and $l_0 = 0.2$ cm. Equation (13) when developed to insert such parameters as $M_2 = 0$ to 100 kgf/cm$^2$ and $r = 0$ to 1 at $M_1 = 40$ kgf/cm$^2$ and $l_0 = 0.2$ cm, giving two $\beta$ constants defined respectively by a $+3.5 \times 10^{-4}$ curve and a $-3.5 \times 10^{-4}$ curve in FIG. 8A. With $M_2 = 30$ kgf/cm$^2$ in view, those thickness ratios sufficient to meet $-3.5 \times 10^{-4} \leq \beta \leq +3.5 \times 10^{-4}$ are such appearing outside an A point (r=0.295) and a B point (r=0.705), the points being the intersections of a $M_2 = 30$ kgf/cm$^2$ dotted line and a $\beta = +3.5 \times 10^{-4}$ curve. The bulge-free thickness ratios, as evidenced by two obliquely lined regions in FIG. 8B, can be expressed as $$0.295 \geq r \geq 0.05$$

$$0.705 \leq r \leq 0.95$$

There is no particular restriction imposed upon the type of materials and the ratio of thicknesses, provided that $M_1$, $M_2$ and r satisfy equations (I) and (II).

Peroxide-curable H-NBRs eligible for the inner wall 21, as shown in FIG. 1, are copolymer rubbers comprising in the polymer chain 10 to 45% by weight of an unsaturated nitrile unit, 0 to 5% by weight of a conjugated diene unit and 90 to 50% by weight of a unit derived by hydrogenating either one or both of an ethylenically unsaturated monomer unit and a conjugated diene unit other than unsaturated nitriles. To be more specific, H-NBRs are the copolymers of the formula:

where Y is an unsaturated nitrile unit, X is a unit resulting from hydrogenating an ethylenically unsaturated monomer unit and/or a conjugated diene unit other than unsaturated nitriles, and Z is a conjugated diene having a C to C double bond.

The contents of Y, X and Z in the copolymer should be in the ranges of 10 to 45%, 90 to 50% and 0 to 5% in this order. The Y contents if smaller than 10% would not be effective in improving oil resistance and if greater than 45% would be unacceptable in low-temperature resistance. The X content should not exceed 90% as it entails too less Y, leading to reduced oil resistance. Smaller X contents than 50% but with much Y would adversely affect resistance at low temperature, whereas smaller X contents than 50% but with less Y and more Z would result in a hose being not sufficiently resistant to deteriorated oil. Departures of Z from the above specified range would fail to give adequate resistance to deteriorated oil.

Typical examples of H-NBRs include hydrogenates from butadiene-acrylonitrile rubber, isoprene-acrylonitrile rubber, butadiene-isoprene-acrylonitrile rubber and the like, butadiene-methyl acrylate-acrylonitrile rubber, butadiene-acrylic acid-acrylonitrile rubber and the like and their hydrogenates, and butadiene-ethyleneacrylonitrile rubber, butyl acrylate-ethoxyethyl acrylate-vinyl chloroacetate-acrylonitrile rubber, butyl acrylate-ethyoxyethyl acrylate-vinyl norbornene-acrylonitrile rubber and the like.

Organic peroxides useful in curing H-NBR are such that do not induce excessive crosslinking at a given range of temperatures within which to fabricate the hose. Particularly preferred are dialkyl peroxides having a half-life period of 10 hours and a decomposition temperature higher than 80° C. Specific examples include dicumyl peroxide, 1,3-bis-(t-butylperoxyisopropyl)benzene, 4,4-di-t-butylperoxyvaleric acid n-butyl and the like.

The amount of the peroxide to be added should be in the range of 0.2 to 15 parts by weight, preferably 0.5 to 10 parts by weight calculated from its net peroxide content, as per 100 parts by weight of H-NBR. Smaller amounts than 0.2 parts would invite insufficient curing, and greater amounts than 15 parts would leave peroxide residue, rendering the finished hose susceptible to over heat-aging.

H-NBR may be blended if necessary with fillers, reinforcing agents, plasticizers, antioxidants and the like commonly known in the art.

Eligible rubber compositions for use in the outer wall 22 are essentially comprised of 100 parts by weight of a sulfur-vulcanizable starting rubber, 0.1 to 10 parts by weight of sulfur, 0.2 to 15 parts by weight of an organic peroxide calculated from its net peroxide content and 0.2 to 15 parts by weight of a 6-R-2,4-dimercapto-1,3,5-triazine.

Any sulfur-vulcanizable rubbers are suitably employed as the starting rubbers and may conveniently be selected for example from natural rubber (NR), polyisoprene rubber (IR), styrene-butadiene rubber (SBR), butadiene rubber (BR), acrylonitrile-butadiene rubber (NBR), ethylene-propylenediene rubber (EPDM) and the like.

Typical examples of sulfur include powdery sulfur, precipitatory sulfur, colloidal sulfur, insoluble sulfur, highly dispersible sulfur, sulfur chloride and the like.

The organic peroxides stated in connection with the inner wall copolymer may suitably be likewise used in the outer wall rubber composition.

Suitable triazine compounds are the compounds of the formula where R is a mercapto, alkoxy, mono- or di-alkylamino, mono- or di-cycloalkylamino, mono- or di-arylamino, or N-alkyl-N'-arylamino group. 2,4,6-Trimercapto-1,3,5-triazine is particularly preferred.

The rubber composition so formulated allows the outer wall to be firmly bonded to the H-NBR rubber on the inner wall and also to the brass-platted wires or organic fibers on the reinforcing layer. The organic peroxide contributes to adequate adhesion to H-NBR, and the triazine compound to sufficient adhesion to brass. Sulfur leads to improved modulus.

Sulfur should range in amount from 0.1 to 10 parts, preferably 0.2 to 5 parts. Smaller amounts than 0.1 part would induce too small modulus, and greater amounts than 10 parts would lead to adversely vulcanized H-

NBR. The amount of the peroxide to be added, as its net peroxide content, should be in the range of 0.2 to 15 parts, preferably 0.5 to 5 parts. The peroxide if smaller than 0.2 part would result in reduced adhesion to H-NBR and if larger than 15 parts would adversely affect heat aging. The triazine compound should be added in an amount of 0.2 to 15 parts, preferably 0.5 to 10 parts. Smaller amounts than 0.2 part would show no appreciable rise in modulus, failing to give adequate adhesion to brass and organic fibers, whereas larger amounts than 15 parts would produce no better results.

Various other additives may be incorporated in the rubber composition, and they include vulcanization accelerators, antioxidants, fillers, softeners, plasticizers, tackifiers, lubricants, peptizers, colorants, foamers, hardeners, dispersants, processing aids and the like.

While the triazine compound serves to accelerate sulfur, different accelerators may preferably be added to further improve modulus. These accelerators include for example aldehyde-ammonias, aldehyde-amines, quanidines, thioureas, thiazoles, sulfenamides, thiurams, dithiocarbamates, xthantogenates and the like.

Any known rubbers are suitable for the outer cover 40 and also for the intermediate layer 50. The layers 30 and 60 may be reinforced by braiding or spirally winding brass-plated wires or fibers.

The following examples are given to further illustrate the invention.

EXAMPLES 1-9 AND COMPARATIVE EXAMPLES 1-7

Different multi-layered hoses as viewed in FIG. 1 were made by a suitable known method with use of the following rubbers and reinforcements. The dimensions of each hose were 12.7 mm in inside diameter and 22.5 mm in outside diameter.

Inner Wall (21)

Formulations A-1 to A-4 shown in Tables 1 and 2. Mixing at 60° C. for 15 min on a mixing mill.

Outer Wall (22)

Formulations B-1 to B-5 of Tables 3 and 4. Similar mixing.

Outer Cover (40)

Chloroprene (CR)-based rubber known in common use.
Similar mixing.

Intermediate Layer (50)

Known NBR-based rubber. Similar mixing.

Reinforcing Layer (30)

Brass-plated wire-braided layer.

Reinforcing Layer (60)

Same as in layer (30).

All the hoses were examined for oil resistance and impulse resistance under load at high temperature under the conditions given below and with the results shown in Tables 5 to 7.

Oil Resistance

JIS B-8360 was followed. A test hose was clamped on both ends with a metal coupler and filled with a hydraulic oil (White Parrot S-3, Showa-Shell Petroleum Co.), followed by aging at 150° C. for 168 hr. This resistance was adjudged by visual inspection of bulging on the inner wall rubber.

Impulse Resistance

Measurement was made using a similar hydraulic oil at 120° and 150° C. and at 140 kgf/cm² with 150% waved stress as stipulated in JIS B-8360.

The rubbers tested were summarized as follows:

| | |
|---|---|
| A-1 and A-2: | H—NBR |
| A-3 and A-4: | NBR |
| B-1 to B-4: | NBR—S—PO—F |
| B-5: | NBR |

The moduli at 50% at 150° C., $M_1$ and $M_2$, were determined on the total thicknesses $l_0$ equal to 2 mm and the thickness ratios r from which the $\beta$ constants were calculated from equation (I). The results were given also in Tables 5 to 7.

The test rubbers were further examined for rubber-rubber adhesion with the results shown in Tables 8 and 9. The data revealed high levels of peel strength (kgf/25 mm) required for rubber destruction to take place, meaning that adhesion was acceptable.

Having thus described the invention, it will be apparent to those skilled in the art that many changes and modifications may be made within the scope of the appended claims.

TABLE 1

| | Inner Wall Rubber: H—NBR | | |
|---|---|---|---|
| Formulations | A-1 | A-2 | Remarks |
| H—NBR | 100 | 100 | |
| (VCH: 33) | | | |
| (C=C: 1.3) | | | |
| (C—C: 65.7) | | | |
| SRF | 95 | 95 | Asahi No. 50, Asahi Carbon Co. |
| MgO | 10 | 10 | |
| ZnO | 2 | 2 | |
| stearic acid | 1 | 1 | |
| Vulkanox DDA | 1.5 | | Bayer AG |
| Vulkanox ZMB-2 | 1.5 | 1.5 | Bayer AG |
| wax | 1 | 1 | PE 520, Hoechst AG |
| TAIC | 2 | 2 | triallyl isocyanulate, Nippon Kasei Co. |
| Witamol 218 | 7 | 7 | trimellitic acid ester, Dynamit Nobel AG |
| Perkerdox 14/40 | 7.5 | 7.5 | Kayaku Nuelly Co. |
| 50% modulus (kgf/cm²) | | | |
| 20° C. | 41 | 55 | |
| 150° C. | 29 | 40 | |

TABLE 2

| | Inner Wall Rubber: NBR | | |
|---|---|---|---|
| Formulations | A-3 | A-4 | Remarks |
| Nipol 1042 | 100 | 100 | Nippon Zeon Co., |
| SRF | 80 | 85 | Asahi No. 50, Asahi Carbon Co. |
| ZnO | 5 | 5 | |
| stearic acid | 1 | 1 | |
| antioxidant OD-3 | 1 | 1 | Nonflex OD-3, Seiko Kagaku Co. |
| plasticizer | 10 | 10 | dioctyl phthalate, Chisso Petrochemical Co. |
| sulfur | 2 | 2 | |
| accelerator TS | 1 | 1 | Sunceller TS-G, Sanshin Kagaku Kogyo Co. |
| 50% modulus (kgf/cm²) | | | |
| 20° C. | 43 | 49 | |
| 150° C. | 31 | 35 | |

TABLE 3

| Formulations | B-1 | B-2 | B-3 | B-4 | Remarks |
|---|---|---|---|---|---|
| Nipol 1042 | 100 | 100 | 100 | 100 | Nippon Zeon Co. |
| SRF | 80 | 80 | 80 | 80 | Asahi No. 50, Asahi Carbon Co. |
| ZnO | 5 | 5 | 5 | 5 | |
| antioxidant OD-3 | 2 | 2 | 2 | 2 | Nonflex OD-3, Seiko Kagaku Co. |
| sulfur | 0.5 | 0.5 | 1 | 1 | |
| accelerator TS | 1 | 1 | 1 | 1 | Sunceller TS-G, Sanshin Kagaku Kogyo Co. |
| Perkerdox 14/40 | 5 | 7.5 | 5 | 7.5 | Kayaku Nuelly Co. |
| ZISNET-F | 1 | 1 | 1 | 1 | Sankyo Kasei Co. |
| 50% modulus (kgf/cm$^2$) | | | | | |
| 20° C. | 43 | 51 | 53 | 63 | |
| 150° C. | 33 | 38 | 42 | 52 | |

Outer Wall Rubber: NBR—S—PO—F

TABLE 4

| Formulations | B-5 | Remarks |
|---|---|---|
| Nipol 1042 | 100 | Nippon Zeon Co. |
| SRF | 60 | Asahi No. 50, Asahi Carbon Co. |
| silica | 20 | Nipsil VN3, Nippon Silica Co. |
| ZnO | 5 | |
| stearic acid | 1 | |
| resorcin | 3 | Sumitomo Kagaku Kogyo Co. |
| ZISNET-F | 2 | 2,4,6-trimercapto-1,3,5-triazine, Sankyo Kasei Co. |
| plasticizer | 10 | dioctyl phthalate, Chisso Petrochemical Co. |
| sulfur | 2 | |
| accelerator CZ | 1 | Sunceller CM—PO, Sanshin Kagaku Kogyo Co. |
| hexamethylene tetraamine | 2 | Nocceller H, Ohuchi Shinko Kagaku Co. |
| 50% modulus (kgf/cm$^2$) | | |
| 20° C. | 27 | |
| 150° C. | 22 | |

Outer Wall Rubber: NBR

TABLE 5

| Properties | Example 1 | Comparative Examples 1 | 2 | 3 | Example 2 |
|---|---|---|---|---|---|
| outer wall rubber | B-2 | B-2 | B-2 | B-2 | B-2 |
| $M_1$ (M50, 150° C.) | 38 | 38 | 38 | 38 | 38 |
| inner wall rubber | A-1 | A-1 | A-1 | A-1 | A-1 |
| $M_2$ (M50, 150° C.) | 29 | 29 | 29 | 29 | 29 |
| total thickness, $l_0$ (cm) | 0.2 | 0.2 | 0.2 | 0.2 | 0.2 |
| thickness ratio, r | 0.1 | 0.35 | 0.5 | 0.65 | 0.9 |
| $(1/M_2 - 1/M_1) \times 100$ | 0.82 | 0.82 | 0.82 | 0.82 | 0.82 |
| $\beta \times 10,000$ | 1.47 | 3.72 | 4.08 | 3.72 | 1.47 |
| bulging, 150° C. × 168 hr | not bulged | bulged | bulged | bulged | bulged |
| impulse resistance at high temperature | | | | | |
| temp: 150° C. pressure: 140 kgf/cm$^2$ × 150% target: 400,000 cycles | ○ | X | X | X | ○ |

○: no failure occurred at 400,000 cycles of run
X: test impossible due to bulging

TABLE 6

| Properties | Example 3 | Comparative Examples 1 | 4 | 5 | Examples 4 | 5 | 6 | 7 |
|---|---|---|---|---|---|---|---|---|
| outer wall rubber | B-1 | B-2 | B-3 | B-4 | B-1 | B-2 | B-3 | B-4 |
| $M_1$ (M50, 150° C.) | 33 | 38 | 42 | 52 | 33 | 38 | 42 | 52 |
| inner wall rubber | A-1 | A-1 | A-1 | A-1 | A-2 | A-2 | A-2 | A-2 |
| $M_2$ (M50, 150° C.) | 29 | 29 | 29 | 29 | 40 | 40 | 40 | 40 |
| total thickness, $l_0$ (cm) | 0.2 | 0.2 | 0.2 | 0.2 | 0.2 | 0.2 | 0.2 | 0.2 |
| thickness ratio, r | 0.35 | 0.35 | 0.35 | 0.35 | 0.35 | 0.35 | 0.35 | 0.35 |
| $(1/M_2 - 1/M_1) \times 100$ | 0.42 | 0.82 | 1.07 | 1.53 | −0.53 | −0.13 | 0.12 | 0.58 |
| $\beta \times 10,000$ | 1.90 | 3.72 | 4.86 | 6.94 | −2.41 | −0.60 | 0.54 | 2.63 |
| bulging, 150° C. × 168 hr | not bulged | bulged | bulged | bulged | not bulged | not bulged | not bulged | not bulged |
| impulse resistance at high temperature | | | | | | | | |
| temp: 150° C. pressure: 140 kgf/cm$^2$ × 150% target: 400,000 cycles | ○ | X | X | X | ○ | ○ | ○ | ○ |

○, X: see footnote to Table 5

TABLE 7

| Properties | Example 8 | Comparative Example 6 | Example 9 | Comparative Example 7 |
|---|---|---|---|---|
| outer wall rubber | B-5 | B-5 | B-5 | B-5 |
| $M_1$ (M50, 150° C.) | 22 | 22 | 22 | 22 |
| inner wall rubber | A-3 | A-3 | A-4 | A-4 |
| $M_2$ (M50, 150° C.) | 31 | 31 | 35 | 35 |
| total thickness, $l_0$ (cm) | 0.2 | 0.2 | 0.2 | 0.2 |
| thickness ratio, r | 0.10 | 0.20 | 0.10 | 0.20 |
| $(1/M_2 - 1/M_1) \times 100$ | −1.32 | −1.32 | −1.69 | −1.69 |
| $\beta \times 10,000$ | −2.38 | −4.22 | −3.04 | −5.40 |
| bulging, 150° C. × 168 hr | not bulged | bulged | not bulged | bulged |

TABLE 7-continued

| Properties | Example 8 | Comparative Example 6 | Example 9 | Comparative Example 7 |
|---|---|---|---|---|
| impulse resistance at high temperature | | | | |
| target: 400,000 cycles | | | | |
| temp: 120° C. | ○ | X | ○ | X |
| 150° C. | oil leaked at 150,000* | X | oil leaked at 180,000* | X |

*): oil leaked due to outer wall rubber (NBR) being less heat-resistant but not to bulging
○, X: see footnote to Table 5

TABLE 8

| Adhesion | | Outer wall rubber NBR—S—PO—F | | | |
|---|---|---|---|---|---|
| | | B-1 | B-2 | B-3 | B-4 |
| Inner wall rubber | A-1 | 15.2 | 15.3 | 14.8 | 15.0 |
| H—NBR | A-2 | 15.3 | 15.5 | 14.9 | 15.0 |

Note: rubber to rubber peel strength (kgf/25 mm) required for rubber destruction to occur

TABLE 9

| Adhesion | | Outer wall rubber NBR—S—PO—F A-5 |
|---|---|---|
| Inner wall rubber | A-3 | 13.5 |
| H—NBR | A-4 | 14.0 |

Note: see footnote to Table 8

We claim

1. A hose comprising a core tube formed of a rubber inner tube and a rubber outer tube thereon, and a reinforcing layer on said core tube, said inner and outer tubes being formed of different rubbers and having the modulus and thickness characteristics set forth in the following equations (I) and (II)

$$-0.00035 \leq l_0 \cdot (1/M_2 - 1/M_1) \cdot r \cdot (1-r) \leq +0.00035 \quad (I)$$

and $$0.05 \leq r \leq 0.95 \quad (II)$$

where $l_0$ (cm) is the total thickness of said core tube;
r is the thickness ratio of said outer tube to said core tube;
$M_1$ (kgf/cm$^2$) is the modulus at 50% elongation of said outer tube at a selected temperature; and
$M_2$ (kgf/cm$^2$) is the modulus at 50% elongation of said inner tube at said selected temperature.

2. The hose according to claim 1 wherein said inner tube is formed of a copolymer rubber comprising in the polymer chain:
   (a) 10 to 45% by weight of an unsaturated nitrile unit;
   (b) 0 to 5% by weight of a conjugated diene unit; and
   (c) 90 to 50% by weight of a unit derived by hydrogenating either one or both of an ethylenically unsaturated monomer unit and a conjugated diene unit other than unsaturated nitriles.

3. The hose according to claim 1 wherein said outer tube is formed of a rubber composition comprising:
   (a) 100 parts by weight of a sulfur-vulcanizable starting rubber;
   (b) 0.1 to 10 parts by weight of sulfur;
   (c) 0.2 to 15 parts by weight of an organic peroxide; and
   (d) 0.2 to 15 parts by weight of a triazine compound represented by 6-R-2,4-dimercapto-1,3,5-triazine where R is a mercapto, alkoxy, mono- or dialkylamino, mono- or dicycloalkyl amino, mono- or di-arylamino, or N-alkylN'-arylamino group.

4. The hose according to claim 1 wherein said reinforcing layer is formed of brass-plated wires.

5. The hose according to claim 2 wherein said copolymer rubber is a hydrogenate from butadiene-acrylonitrile rubber, isoprene-acrylonitrile rubber or butadiene-isoprene-acrylonitrile rubber, or butadiene-methyl acrylate-acrylonitrile rubber, butadiene-acrylic acid-acrylonitrile rubber or a hydrogenate thereof, or butadiene-ethylene-acrylonitrile rubber, butyl acrylate-ethoxyethyl acrylate-vinylchloro acetate-acrylonitrile rubber or butyl acrylate-ethoxyethyl acrylate-vinyl norbornene-acrylonitrile rubber.

6. The hose according to claim 3 wherein said starting rubber is natural rubber, polyisoprene rubber, styrene-butadiene rubber, butadiene rubber, acrylonitrile-butadiene rubber or ethylene-propylene-diene rubber.

7. The hose according to claim 3 wherein said organic peroxide is dicumyl peroxide, 1,3-bis-(t-butyl-peroxyisopropyl)benzene or 4,4-di-t-butylperoxy valeric acid n-butyl.

8. The hose according to claim 3 wherein said triazine compound is 2,4,6-trimercapto-1,3,5-triazine.

* * * * *

UNITED STATES PATENT AND TRADEMARK OFFICE
CERTIFICATE OF CORRECTION

PATENT NO. : 5,158,113

DATED : October 27, 1992

INVENTOR(S) : Osamu Ozawa and Takashi Sato

It is certified that error appears in the above-identified patent and that said Letters Patent is hereby corrected as shown below:

Claim 3, column 12, line 34, "N-alkylN'-arylanio" should read --N-alkyl-N'-arylamino--.

Signed and Sealed this

Twenty-third Day of November, 1993

Attest:

BRUCE LEHMAN

Attesting Officer          Commissioner of Patents and Trademarks